Feb. 17, 1931.  T. G. JOHNSON  1,792,589
CLEANING DEVICE
Filed Jan. 27, 1930  2 Sheets-Sheet 1
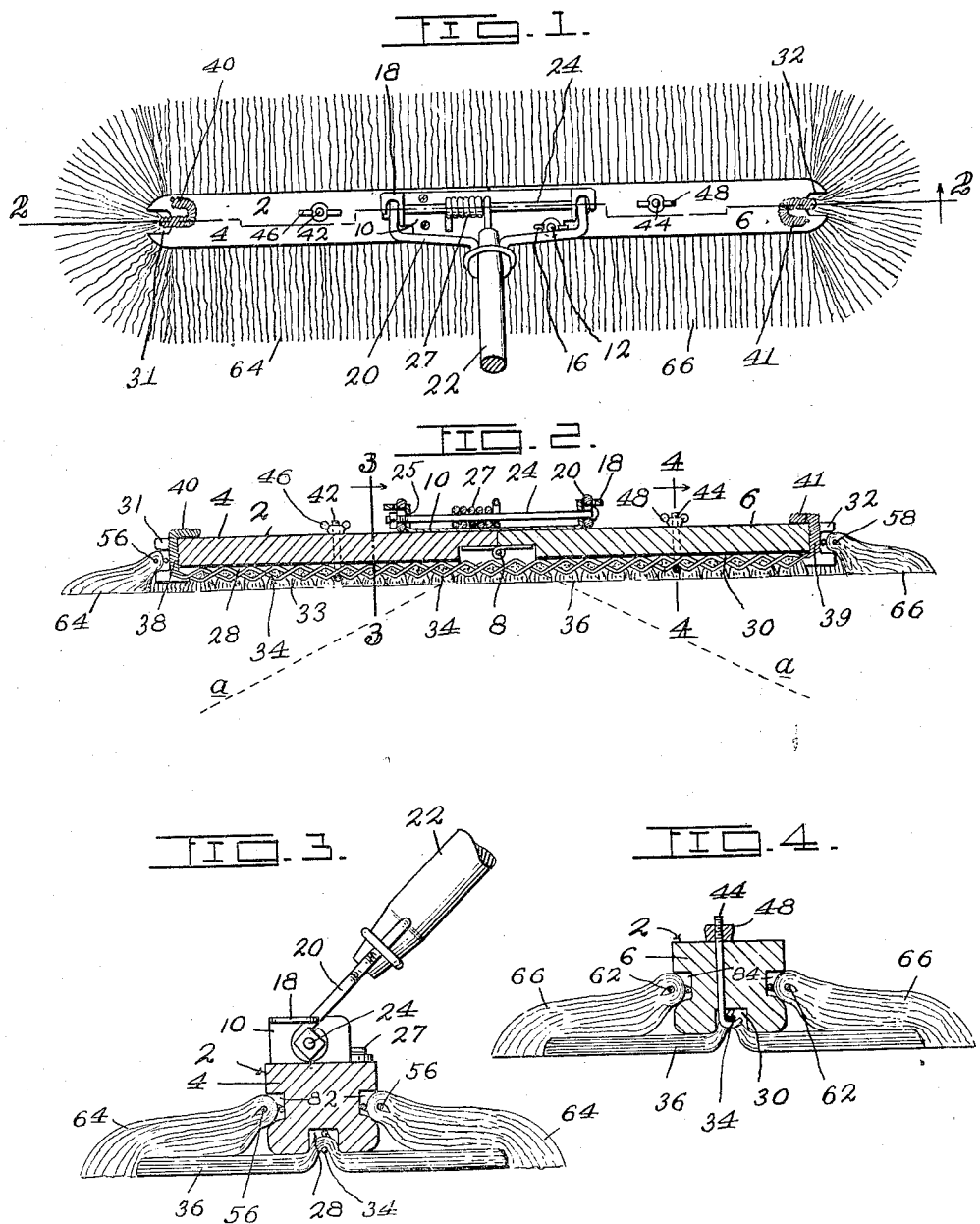
INVENTOR:
Theodore G. Johnson,
Witness:
Fred C. Fischer.
BY
F. G. Fischer,
ATTORNEY

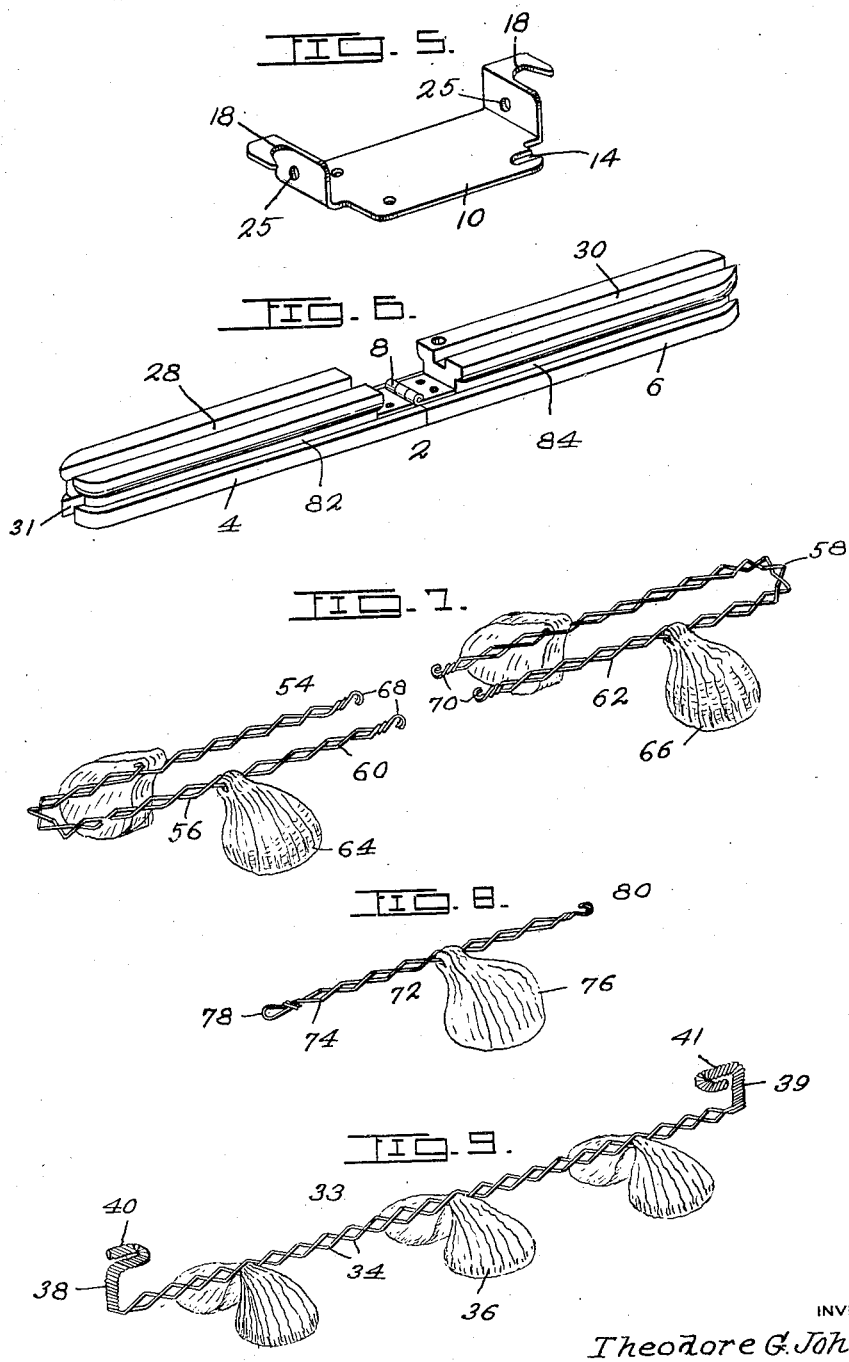

Patented Feb. 17, 1931

1,792,589

UNITED STATES PATENT OFFICE

THEODORE G. JOHNSON, OF KANSAS CITY, MISSOURI

CLEANING DEVICE

Application filed January 27, 1930. Serial No. 423,726.

My invention relates to devices for removing dust and other foreign matter from floors, walls, ceilings and other surfaces and one object is to provide a device of this character consisting of a plurality of parts which can be readily assembled or taken apart so that worn out parts can be replaced at small expense.

Another object is to make some of the parts reversible so that when worn out on one side they may be turned over to present a new cleaning side.

A further object is to make some of the cleaning parts in units so that they may be lengthened or shortened by adding or removing units.

Other objects will hereinafter appear and in order that the invention may be fully understood, reference will now be had to the accompanying drawings, in which:

Fig. 1 is a plan view of the device with a portion of the handle broken away.

Fig. 2 is a longitudinal section of the device on line 2—2 of Fig. 1.

Fig. 3 is a vertical cross section of the device on line 3—3 of Fig. 2.

Fig. 4 is a vertical cross section on line 4—4 of Fig. 2.

Fig. 5 is a detail perspective view of a plate to which the handle is removably secured.

Fig. 6 is an inverted perspective view of the head of the device.

Fig. 7 is a detail perspective view of two outer members of the device in position for assembly and with some of the cleaning material removed.

Fig. 8 is a detail perspective of one of a plurality of extension elements for use in connection with the two outer members shown by Fig. 7 and with some of the cleaning material removed.

Fig. 9 is a detail perspective view of an intermediate member of the device with some of the cleaning material removed.

In the present instance I have shown the device arranged in the form of a mop, although it may be arranged as a brush, or other cleaning device for cleaning floors, walls, etc.

The present embodiment of invention includes a mop head 2 which may be made of any suitable material and consists in the present instance of two members 4 and 6 operably connected at their adjacent ends by means of a hinge 8.

10 designates a plate which is permanently secured to the member 4 and detachably connected to the member 6 of the mop head 2 by suitable means such as a bolt 12 which extends through said member 6 and a slot 14 in the plate 10 and is held in place with a nut 16. The ends of the plate 10 extend upwardly and outwardly in opposite directions where they are formed into shoulders 18 for limiting the upward movement of a bail 20 connected at its upper intermediate portion to a handle 22 and at its lower ends to a member 24 extending through openings 25 in the upturned portions of the plate 10.

The handle 22 is yieldably supported at a convenient angle by means of a spring 27 which is loosely coiled around the member 24 and has one end secured to said handle 22 and its opposite end pressing upon the plate 10.

The members 4 and 6 of the mop head 2 are provided at their undersides with aligned longitudinal grooves 28 and 30, which communicate with vertically disposed notches 31 and 32 in the outer ends of said members 4 and 6, respectively.

33 designates an intermediate member consisting in the present instance of cables 34 composed of wires or other suitable elements which are twisted together as shown by Figs. 2 and 9, for the purpose of holding cleaning material 36, such as cotton yarn or the like. The end portions of the cables 34 are bent upwardly as indicated at 38 and 39, to pass through the notches 31 and 32, and then towards each other as indicated at 40 and 41 to engage over the upper surface of the members 4 and 6, respectively, for securing said intermediate member to the mop head 2.

The intermediate member 33 is further held in position by hook-shaped retaining elements 42 and 44, which extend upwardly through the mop head members 4 and 6 and are provided at their upper ends with tightening members 46 and 48 whereby their bent lower ends are caused to draw the cables 34 firmly against the upper sides of the grooves 28 and 30, respectively.

54 designates outer members for surrounding the mop head 2 and the intermediate member 33. Said outer members 54 consist of two U-shaped units 56 and 58 composed of cables 60 and 62, and cleaning material 64 and 66, respectively. The cables 60 and 62 consist preferably of wires which are twisted together to firmly hold the respective cleaning materials 64 and 66 in place. The adjacent ends of the cables 60 and 62 are formed into hooks or other fastening means 68 and 70, so that said cables may be detachably connected with each other or with a suitable number of extension elements 72 when it is desired to add to the outer members 54 for use on longer mop heads.

Each extension element 72 consists of a cable 74 which is twisted together for holding cleaning material 76 which may be similar to the cleaning materials 64 and 66. The cable 74 has a loop 78 at one end for connection to either of the hooks 68, and a hook 80 at its opposite end for connection with either of the hooks 70.

In practice the mop may be readily assembled as follows: First the nut 16 is removed from the bolt 12 to permit the hinge 8 to operate, so that the outer ends of the members 4 and 6 may be adjusted toward each other as indicated by dotted lines a, Fig. 2, far enough to permit installation of the intermediate member 33, the upturned portions 38 and 39 of which are inserted in the notches 31 and 32, respectively, of the mop head 2. The units 56 and 58 of the outer members 54 are then connected and their outer ends are inserted in the outer ends of grooves 82 and 84 extending longitudinally of the front and rear sides of the members 4 and 6, respectively. The mop head 2 is then straightened out by applying pressure upon the plate 10 until the latter contacts with the upper surface of the mop head member 6 to which it is firmly secured by the bolt 12 and nut 16. As the mop head 2 is straightened out as above described the cables 34 of the intermediate member 33 are drawn taut and enter the grooves 28 and 30 in which they are then reliably secured by means of the retaining elements 42 and 44. Straightening of the mop head 2 also draws the cables 60 and 62 of the outer members 54 taut and into the groves 82 and 84, respectively, where they are firmly held under tension. By reversing the operation above described the several parts may be readily disconnected, so that repairs or renewal of worn out parts can be readily effected.

When the cleaning material of the outer members 54 becomes worn on the lower side said material can be turned over to present the other side and thereby avoid the expense of frequent renewals. Should a mop head of greater length than the outer members 54 be employed said outer section may be lengthened to fit said head by adding the extension elements 72. When the mop is in operation the shoulders 18 and the spring 27 prevent the mop head 2 from rocking unduly independently of the handle 22.

When a cheaper device is desired either the intermediate member 33 or the outer members 54 may be dispensed with.

From the foregoing description it will be understood that I have provided a cleaning device consisting of a plurality of parts which can be readily assembled or taken apart, and while I have shown one embodiment of the invention I reserve all rights to such changes and modifications thereof as properly fall within the spirit and scope of the invention as claimed.

Having thus described my invention, what I claim and desire to secure by Letters Patent, is:

1. In a cleaning device, a head consisting of a plurality of members hingedly connected so that they may be swung in or out of alignment with each other, a plate extending longitudinally of said head and permanently secured to one of said members and overlapping another of said members, an element extending upwardly through the last-mentioned member for detachably securing the plate to the latter, and a handle connected to said plate.

2. In a cleaning device, a head consisting of a plurality of members having notched outer ends and hingedly connected so that they may be swung in or out of alignment with each other, and a section of wire cable having cleaning means and upturned ends terminating in hooks for engagement with the notched ends of said members, said wire adapted to be drawn taut and held in position on said head when the members are adjusted into alignment with each other.

3. In a cleaning device, a head consisting of two members having notched outer ends and which are foldably connected so that they may be swung in or out of alignment with each other, and a section of wire cable having cleaning means and ends which are turned upwardly and towards each other for engaging the notched ends and upper surfaces of said members.

4. In a cleaning device, a head consisting of a plurality of members foldably connected so that they may be swung in or out of alignment with each other, two flexible U-shaped units loosely connected at their inner ends and having outer terminals adapted to engage the outer ends of said members so that said units will be drawn taut and held in position on said head when the outer ends of the latter are adjusted away from each other, and cleaning means secured to said units.

5. In a cleaning device, a head having longitudinal grooves in its front and rear sides, a handle for said head, two detachably connected U-shaped members consisting of cables twisted together and adapted to fit within said longitudinal grooves, and cleaning means secured in the twisted portions of said cables.

6. In a cleaning device, a head consisting of two members, hinge means operably connecting said members, a plate permanently fixed to one of said members and detachably connected to the other member, said plate having upturned ends with outturned shoulders, a member spanning said upturned ends, a bail operably connected to said member and adapted to have its upward movement limited by said shoulders, a handle connected to said bail, and spring means connected to said handle and bearing against the plate.

7. A cleaning device consisting of a head having a plurality of members operably connected so that they may be swung in or out of alignment with each other, a handle connected to said head, an intermediate member having cleaning means and ends adapted to engage the ends of the head and be drawn taut thereby and held in position thereon when the members are swung into alignment with each other, and outer members having cleaning means and adapted to surround the head and be drawn taut thereby when the head members are swung into alignment with each other.

In testimony whereof I affix my signature.

THEODORE G. JOHNSON.